E. A. HUDSON.
SKILLET.
APPLICATION FILED DEC. 16, 1907.
905,318.
Patented Dec. 1, 1908.
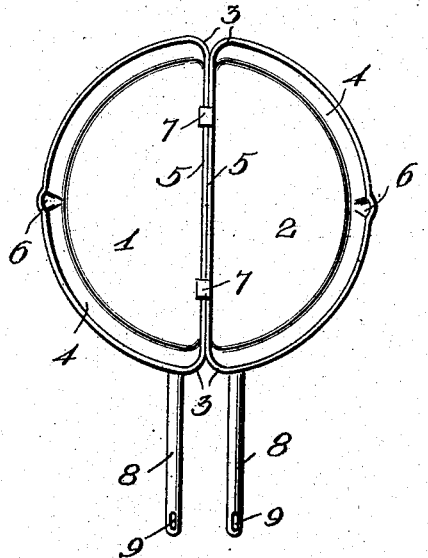
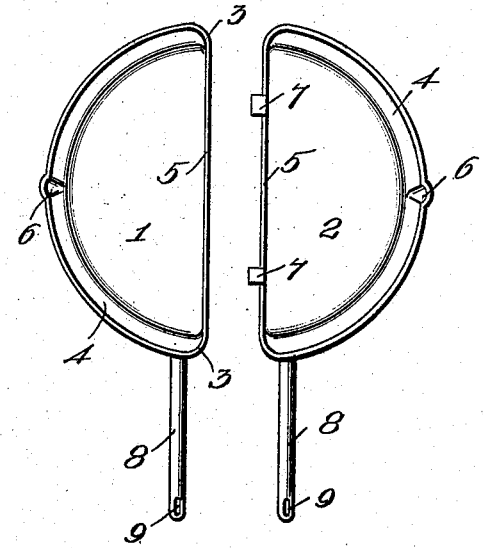
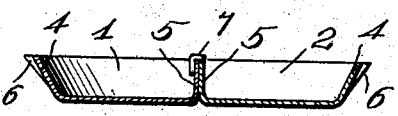
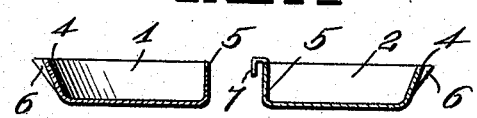
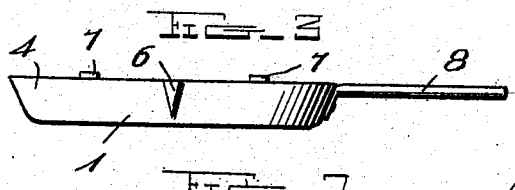
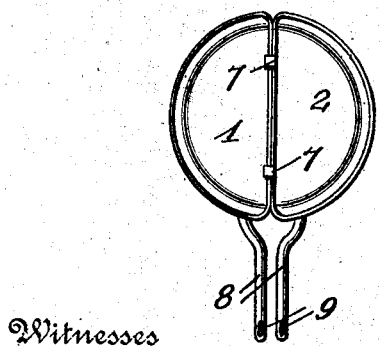
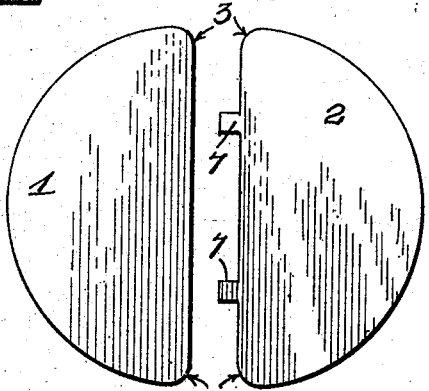
Witnesses
Inventor
E. A. Hudson
By H. B. Willson & Co.
Attorneys

UNITED STATES PATENT OFFICE.

EDWARD A. HUDSON, OF OQUAWKA, ILLINOIS.

SKILLET.

No. 905,318.          Specification of Letters Patent.          Patented Dec. 1, 1908.

Application filed December 16, 1907. Serial No. 406,752.

*To all whom it may concern:*

Be it known that I, EDWARD A. HUDSON, a citizen of the United States, residing at Oquawka, in the county of Henderson and State of Illinois, have invented certain new and useful Improvements in Skillets; and I do declare the following to be a full, clear, and exact description of the invention, such as will enable others skilled in the art to which it appertains to make and use the same.

This invention relates to improvements in skillets or frying pans.

The object of the invention is to improve the construction of skillet shown and described in United States Letters-Patent, No. 863,536, granted to me August 13, 1907, whereby the construction shown therein will be greatly simplified, and the cost of manufacturing the same materially reduced.

With this object in view, the invention consists of certain novel features of construction, combination and arrangement of parts as will be described hereinafter and particularly pointed out in the appended claims.

In the accompanying drawings, Figure 1 is a plan view of a skillet constructed in accordance with the invention, and showing the parts of the same connected together and arranged in position for use; Fig. 2 is a similar view showing the parts separated; Fig. 3 is a side view; Fig. 4 is a vertical transverse sectional view through the two sections of the pan showing the same connected together; Fig. 5 is a similar view showing the parts or sections separated; Fig. 6 is a plan view of the blanks from which the sections or parts of the pan are stamped; and Fig. 7 is a plan view of a portion of the pan sections showing a modified form of handle.

In the embodiment of the invention I provide a pan or skillet formed of a plurality of separable sections, and in the present instance the skillet is shown as consisting of two sections or parts, 1 and 2, each of which is stamped or otherwise formed from substantially semi-circular blanks of sheet metal, the corners of which are rounded off, as shown at 3, to facilitate the operation of stamping or forming the pans, and to facilitate cleaning.

In forming the pans the curved or semicircular sides, 4, of the same are preferably inclined or flared outwardly, whereas the straight sides, 5, are formed flat or perpendicularly so that when brought together, said flat sides will closely engage each other as shown.

In the curved sides, 4, of the pan sections are preferably formed pouring spouts, 6, while on the flat side of the section 1, at the upper edge of the same, are formed offset lugs, 7, which are bent downwardly to form hooks, which, when the sections of the pan are brought together, are adapted to be engaged with the upper edge of the flat side of the opposing section, 2, thus detachably securing the sections together.

Adapted to be riveted or otherwise secured to the outer side of each section, preferably at one of the rounded corners thereof, are handles, 8, which are preferably formed of sheet metal turned or bent to form a tubular or a flat handle, the inner end of which is bent downwardly to form an attaching plate which is riveted or otherwise secured to the side of the pan, as hereinbefore described.

In the outer ends of the handles, 8, are formed elongated openings, 9, by means of which the pan sections may be hung upon a nail or other suitable support.

In Fig. 7 of the drawings the handles are shown as having outwardly curved inner attaching ends whereby when said handles are secured to the sections of the pan, the outer portions of the same are brought closer together than when constructed straight as shown in the first figures of the drawing.

A sectional pan formed as herein shown and described, is of extremely simple construction and may be manufactured at comparatively small expense, the construction and formation being such that the sections of the pan may be readily stamped out of sheet metal blanks, the latter being cut or formed by a suitable cutting die.

Having thus fully described my invention, what I claim as new and desire to secure by Letters-Patent, is:

1. A cooking utensil comprising a plurality of sections having a flat side and connecting lugs on the contacting surfaces of certain of said sections adapted to be engaged with the flat sides of the adjacent sections to form the sole means for detachably connecting the said sections together, substantially as described.

2. A cooking utensil formed in independent sections having a flat side, and connecting lugs on the flat side of one of said sections to form hooks to engage the flat contacting side of the adjacent section and thereby provide the means to detachably connect said sections together, substantially as described.

3. A skillet formed in independent sections having flat contacting sides, hooked connecting lugs on the flat surface of one of said sections to engage the flat contacting surface of the adjacent section to form the means whereby said sections are detachably held together, and handles having outwardly curved inner ends adapted to be secured to said sections whereby the latter may be lifted separately or hooked together, substantially as described.

In testimony whereof I have hereunto set my hand in presence of two subscribing witnesses.

EDWARD A. HUDSON.

Witnesses:
J. W. GORDON,
JOHN O. WYMAN.